US010245798B2

(12) United States Patent
Wan

(10) Patent No.: US 10,245,798 B2
(45) Date of Patent: *Apr. 2, 2019

(54) METHOD FOR MANUFACTURING A MIDSOLE FORMED FROM TWO PREFORMS

(71) Applicant: NIKE, Inc., Beaverton, OR (US)

(72) Inventor: Tee L. Wan, Portland, OR (US)

(73) Assignee: NIKE, Inc., Beaverton, OR (US)

(*) Notice: Subject to any disclaimer, the term of this patent is extended or adjusted under 35 U.S.C. 154(b) by 173 days.

This patent is subject to a terminal disclaimer.

(21) Appl. No.: 15/353,903

(22) Filed: Nov. 17, 2016

(65) Prior Publication Data

US 2018/0133995 A1    May 17, 2018

(51) Int. Cl.
| B29D 35/14 | (2010.01) |
| B29C 44/02 | (2006.01) |
| B29C 44/12 | (2006.01) |
| B29C 44/34 | (2006.01) |
| B29C 44/56 | (2006.01) |
| B29D 35/04 | (2010.01) |
| B29C 44/04 | (2006.01) |
| B29C 44/08 | (2006.01) |
| A43B 13/12 | (2006.01) |
| B29K 23/00 | (2006.01) |
| B29K 105/00 | (2006.01) |
| B29L 31/50 | (2006.01) |

(52) U.S. Cl.
CPC .......... *B29D 35/142* (2013.01); *A43B 13/127* (2013.01); *B29C 44/04* (2013.01); *B29C 44/08* (2013.01); *B29C 44/3415* (2013.01); *B29C 44/5627* (2013.01); *B29K 2023/083* (2013.01); *B29K 2105/253* (2013.01); *B29K 2995/0021* (2013.01); *B29L 2031/504* (2013.01)

(58) Field of Classification Search
CPC ............ B29C 44/3465; B29C 44/3476; B29C 44/3496; B29C 44/0453; B29C 44/08; B29C 44/04; B29C 44/5627; B29C 44/3415; A43B 13/125; A43B 13/12
See application file for complete search history.

(56) References Cited

U.S. PATENT DOCUMENTS

| 5,743,027 A | 4/1998 | Barma |
| 7,056,459 B2 | 6/2006 | Park |

(Continued)

*Primary Examiner* — Joseph S Del Sole
*Assistant Examiner* — Mohamed K Ahmed Ali
(74) *Attorney, Agent, or Firm* — Banner & Witcoff, Ltd.

(57) ABSTRACT

A method of manufacturing a midsole for an article of footwear includes placing first and second preforms in a first mold, closing and heating the first mold to produce a midsole preform with a peripheral preform flange, removing the midsole preform from the first mold and allowing it to further expand and cool, placing the midsole preform in a second mold, with a volume of a midsole recess of the second mold being less than a volume of the midsole preform, and a volume of a peripheral recess of the second mold being less than a volume of the peripheral preform flange, closing the second mold thereby compressing the midsole preform and the peripheral preform flange, and heating the second mold to form a midsole with a peripheral flange, allowing the second mold to cool, opening the second mold, and cutting away a peripheral flange of the midsole.

15 Claims, 4 Drawing Sheets

(56) References Cited

U.S. PATENT DOCUMENTS

| | | |
|---|---|---|
| 7,107,235 B2 | 9/2006 | Lyden |
| 8,662,875 B2 | 3/2014 | Lim et al. |
| 8,844,170 B2 | 9/2014 | Ferrigan et al. |
| 2013/0036627 A1* | 2/2013 | Wan .................. A43B 13/127 36/83 |
| 2013/0199711 A1* | 8/2013 | Davis .................. B29D 35/00 156/245 |
| 2013/0291409 A1 | 11/2013 | Reinhardt et al. |
| 2016/0135537 A1 | 5/2016 | Wawrousek et al. |

\* cited by examiner

METHOD FOR MANUFACTURING A MIDSOLE FORMED FROM TWO PREFORMS

FIELD

Aspects of this invention relate generally to a method of manufacturing a midsole and, in particular, manufacturing a midsole of two preforms, which may have different colors.

BACKGROUND

Conventional articles of athletic footwear include two primary elements, an upper and a sole assembly. The upper provides a covering for the foot that comfortably receives and securely positions the foot with respect to the sole assembly. In addition, the upper may have a configuration that protects the foot and provides ventilation, thereby cooling the foot and removing perspiration. The sole assembly is secured to a lower portion of the upper and is generally positioned between the foot and the ground. In addition to attenuating ground reaction forces, the sole assembly may provide traction, control foot motions (e.g., by resisting over pronation), and impart stability, for example. Accordingly, the upper and the sole assembly operate cooperatively to provide a comfortable structure that is suited for a wide variety of activities, such as walking and running. An insole may be located within the upper and adjacent to a plantar (i.e., lower) surface of the foot to enhance footwear comfort, and is typically a thin, compressible member.

The sole assembly may incorporate multiple layers. Some articles of footwear include only a midsole, while others may also include an outsole secured to a bottom surface of the midsole. The midsole, which is conventionally secured to the upper along the length of the upper, is primarily responsible for attenuating ground reaction forces. The midsole may also form the ground-contacting element of footwear. In such embodiments, the midsole may include texturing, such as projections and recesses or grooves, in order to improve traction. The outsole, when present, forms the ground-contacting element and may be fashioned from a durable, wear-resistant material.

The midsole may be primarily formed from a resilient, polymer foam material, such as ethyl vinyl acetate (EVA), that extends throughout the length of the footwear. The properties of the polymer foam material in the midsole are primarily dependent upon factors that include the dimensional configuration of the midsole and the specific characteristics of the material selected for the polymer foam, including the density of the polymer foam material. By varying these factors throughout the midsole, the relative stiffness and degree of ground reaction force attenuation may be altered to meet the specific demands of the activity for which the footwear is intended to be used. In addition to polymer foam materials, conventional midsoles may include, for example, one or more fluid-filled bladders and moderators.

The midsole may be formed of two or more portions, with some or all of the portions having different colors. When a midsole is formed in a mold assembly, such as with EVA, the color or boundary line between the different colored portions may bleed, decreasing the aesthetic appeal of the footwear.

Figure 1:
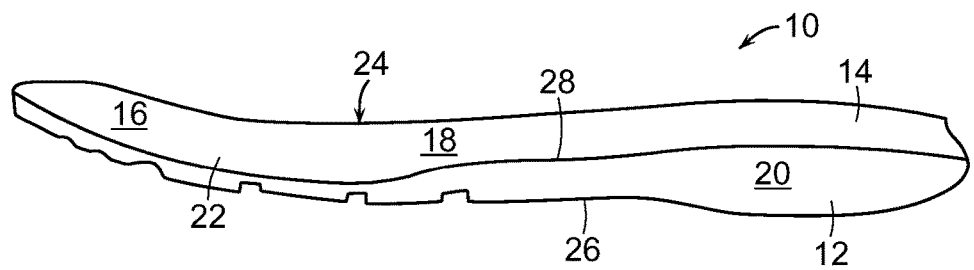
FIG. 1 is an elevation view of a midsole formed from two preforms.
Figure 2:
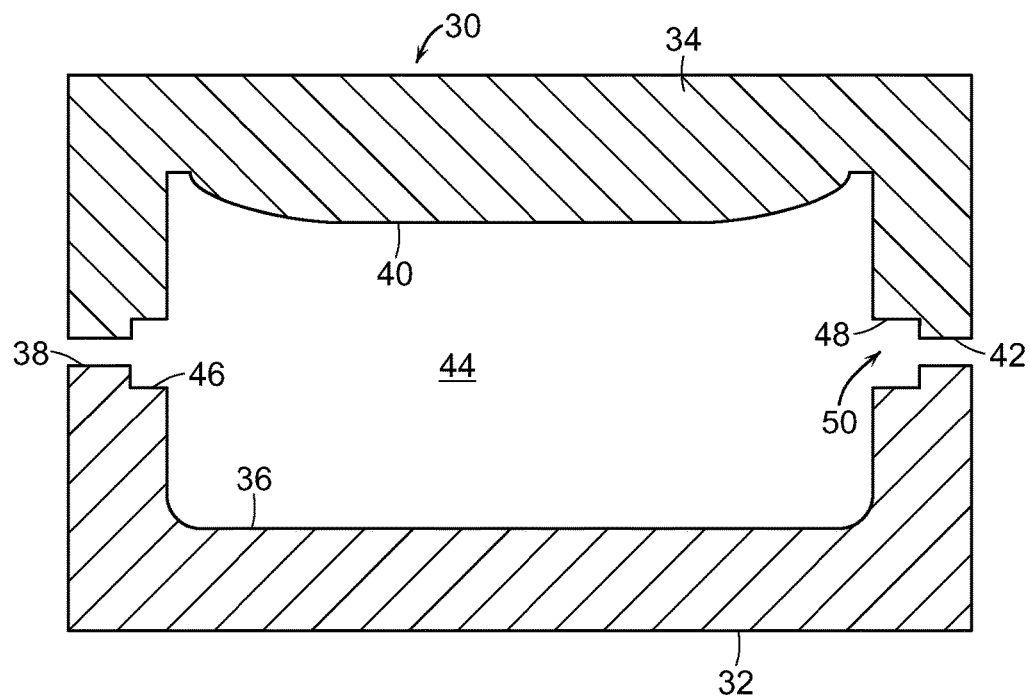
FIG. 2 is a section view of first and second portions of a first mold used to form the midsole of FIG. 1.
Figure 3:
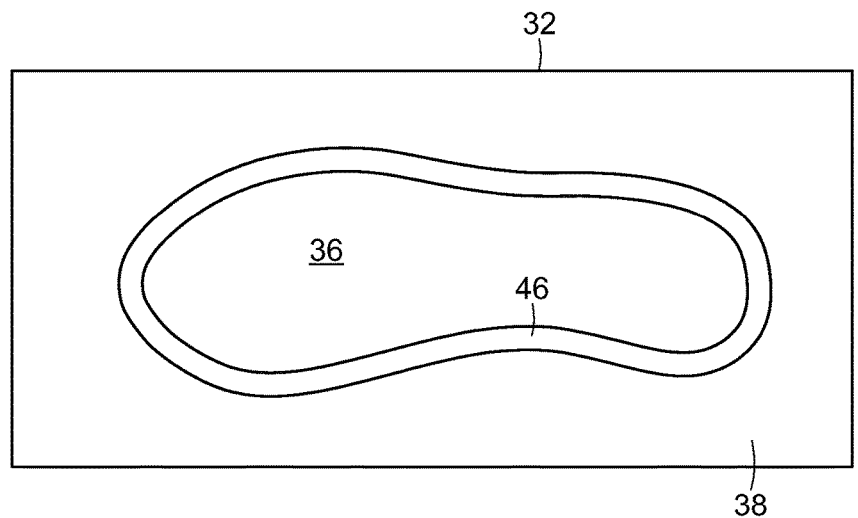
FIG. 3 is a plan view of the first portion of the first mold of FIG. 2.
Figure 4:
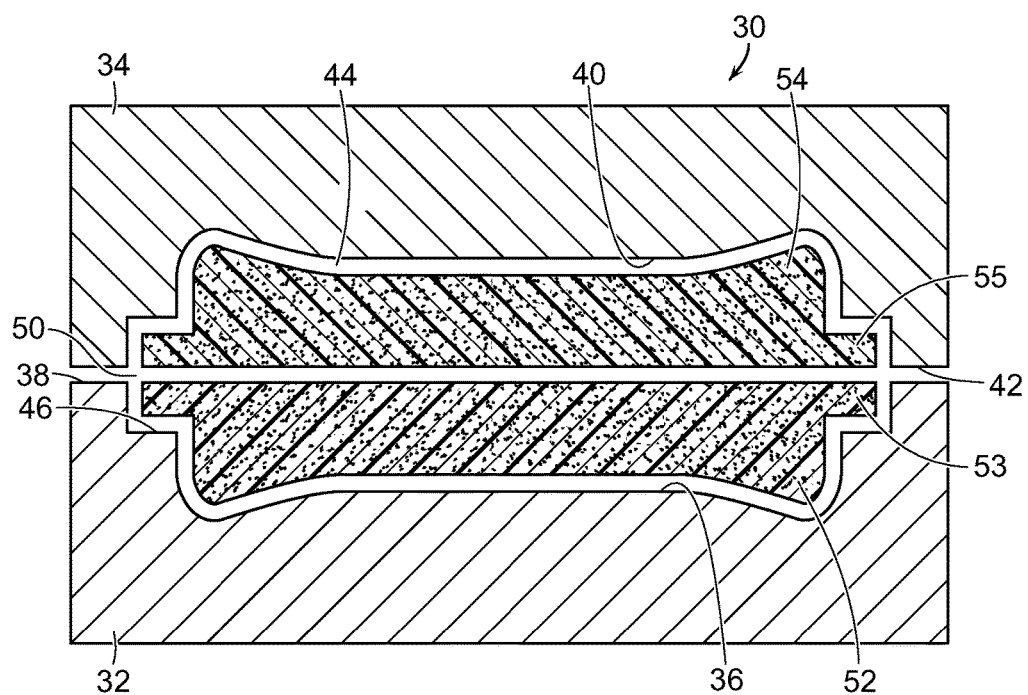
FIG. 4 is a section view of the first and second portions of the first mold of FIG. 2, shown with first and second preforms positioned in a preform recess of the first mold.

The figures referred to above are not drawn necessarily to scale, should be understood to provide a representation of particular embodiments of the invention, and are intended to concisely illustrate the principles involved. Some features of the mold assembly used to form a sole assembly formed of different preforms and related methods of manufacture depicted in the drawings have been enlarged or distorted relative to others to facilitate explanation and understanding. In general, the same reference numbers are used in the drawings for similar or identical components and features shown in various alternative embodiments. Mold assemblies used for forming midsoles as disclosed herein would have configurations and components determined, in part, by the intended application and environment in which they are used.

DETAILED DESCRIPTION OF EXEMPLARY EMBODIMENTS

It would be desirable to provide a midsole formed from two or more portions and a method and mold for manufacturing such a midsole that reduces or overcomes some or all of the difficulties inherent in prior known devices. Applicant recognizes that the principles of the invention may be used to advantage to provide a method of manufacturing a midsole formed of portions having different colors as well as different performance characteristics.

In accordance with a first aspect, a method of manufacturing a midsole for an article of footwear includes placing first and second preforms in contact with one another in a preform recess in a first mold, first and second portions of the first mold cooperating to define the preform recess and a peripheral overflow chamber extending about a periphery of the preform recess; closing the first mold by positioning the first and second portions in contact with one another; heating the first mold for a predetermined period of time at a predetermined temperature such that the first and second preforms expand within the preform recess and into the peripheral overflow chamber to produce a midsole preform with a peripheral preform flange extending about a periphery of the midsole preform; removing the midsole preform from the first mold; allowing the midsole to further expand and cool; placing the midsole preform in a midsole recess of a second mold and the peripheral preform flange in a peripheral recess of the second mold, first and second portions of the second mold cooperating to define the midsole recess and the peripheral recess extending about a periphery of the midsole recess, with a volume of the midsole recess being less than a volume of the midsole preform, and a volume of the peripheral recess being less than a volume of the peripheral preform flange; closing the second mold by positioning the first and second portions in contact with one another, thereby compressing the midsole preform and the peripheral preform flange to produce a midsole with a peripheral flange; heating the second mold for a predetermined period of time at a predetermined temperature; allowing the second mold to cool; opening the second mold; and cutting away the peripheral flange of the midsole.

In accordance with another aspect, a method of manufacturing a midsole for an article of footwear includes placing a first preform having a first preform peripheral flange and a second preform having a second preform peripheral flange in contact with one another in a preform recess in a first mold, the first and second preforms being positioned in a preform recess in the first mold, a first recess formed in a first portion of the first mold and a second recess formed in a second portion of the first mold cooperating to define the preform recess, the first and second preform peripheral flanges being positioned in a peripheral overflow chamber of the first mold, a first overflow recess formed in the first portion of the first mold and a second overflow recess formed in the second portion of the first mold cooperating to define the peripheral overflow chamber; closing the first mold by positioning the first and second portions in contact with one another; heating the first mold for a predetermined period of time at a predetermined temperature such that the first and second preforms expand within the preform recess and the first and second preform peripheral flanges expand within the peripheral overflow chamber to produce a midsole preform with a peripheral preform flange extending about a periphery of the midsole preform; removing the midsole preform from the first mold; allowing the midsole to further expand and cool; placing the midsole preform in a midsole recess of a second mold and the peripheral flange in a peripheral recess of the second mold, a first recess in the first portion of the second mold and a second recess in the second portion of the second mold cooperating to define the midsole recess, a first peripheral recess in the first portion of the second mold and a second peripheral recess in the second portion of the second mold cooperating to define and the peripheral recess extending about a periphery of the midsole recess, with a volume of the midsole recess being less than a volume of the midsole preform and a volume of the peripheral recess being less than a volume of the peripheral flange; closing the second mold by and compressing the midsole preform and the peripheral preform flange by aligning the first recess in the first portion of the second mold and the second recess in the second portion of the second mold and bringing the first and second portions into contact with one another to form a midsole with a peripheral flange; heating the second mold for a predetermined period of time at a predetermined temperature; allowing the second mold to cool; opening the second mold; and cutting away the peripheral flange of the midsole.

By providing a method for manufacturing such a midsole, footwear with improved aesthetic appeal and/or performance can be produced. These and additional features and advantages disclosed here will be further understood from the following detailed disclosure of certain embodiments.

A sole assembly or midsole 10 for an article of footwear is depicted in FIG. 1. It is to be appreciated that in certain embodiments, an outsole (not shown) may be secured to the bottom surface of midsole 10, and midsole 10 may be secured beneath an upper, in conventional fashion. In other embodiments, the bottom surface of midsole 10 itself may serve as the ground-engaging portion (or other contact surface-engaging portion) of an article of footwear.

Midsole 10 serves, among other things, to provide shock-attenuation and energy-absorption for an article of footwear. Midsole 10 can be used for any of various articles of casual footwear having configurations suitable, for example, for walking or lounging. Midsole 10 may also be included as part of a wide range of athletic footwear styles, including shoes that are suitable for soccer, running, basketball, baseball, cross-training, football, rugby, tennis, and volleyball, for example. An individual skilled in the relevant art will appreciate, therefore, that the concepts disclosed herein with regard to midsole 10 may be applied to a wide variety of footwear styles, in addition to the specific styles discussed herein and depicted in the accompanying figures.

Midsole 10 includes a first portion 12, which may be formed of a first material and may have a first color, and a second portion 14, which may be formed of a second material and may have a second color. The second color may be a different color than the first color. In the illustrated embodiment, second portion 14 is positioned above first portion 12. However, it is to be appreciated that first portion 12 and second portion 14 can be oriented in any desired manner with respect to one another.

The discussion of midsole 10 herein primarily describes midsole 10 as being formed of a first portion 12 and a second portion 14. However, it is to be appreciated that midsole 10 can include more than just these two portions.

In certain embodiments, the first and second materials may also have different physical properties from one another and, therefore, different performance characteristics. For example, the hardness of the various portions may be different from one another. It is to be appreciated that any of the known physical properties or performance characteristics for sole assemblies can be different for the different portions of midsole 10, thereby altering the support, cushioning, load carrying capability, wear characteristics, and tread life of midsole 10, for example. Other suitable physical properties or performance characteristics will become readily apparent to those skilled in the art, given the benefit of this disclosure.

For purposes of reference in the following description, midsole 10 may be divided into three general regions: a forefoot region 16, a midfoot region 18, and a heel region 20. Regions 16-20 are not intended to demarcate precise areas of midsole 10. Rather, regions 16-20 are intended to represent general areas of midsole 10 that provide a frame of reference during the following discussion. Although regions 16-20 apply generally to midsole 10, references to regions 16-20 also may apply specifically to first portion 12, second portion 14, or individual components or portions of midsole 10.

For purposes of reference, midsole 10 includes a medial side 22 and an opposite lateral side 24. Lateral side 24 is positioned to extend along a lateral side of the foot (i.e., the outside) and generally passes through each of regions 16-20. Similarly, medial side 22 is positioned to extend along an opposite medial side of the foot (i.e., the inside) and generally passes through each of regions 16-20.

As noted above, a separate outsole member may be secured to a bottom surface 26 of midsole 10, and serve as the ground-engaging surface of the footwear. In other embodiments, bottom surface 26 itself may serve as the ground-engaging surface of the footwear.

In known fashion, an upper may be secured to the upper surface of midsole 10 in order to fully form the footwear. The upper may be secured to midsole 10 with an adhesive, or in any other known fashion. The upper is not shown here as those skilled in the art are well aware of how an upper is secured to a midsole, and, therefore, such a drawing is not necessary for an understanding of the invention.

The materials used to form first portion 12 and second portion 14 of midsole 10 may be injection phylon (ethylene vinyl acetate or "EVA"). The EVA may have a vinyl acetate (VA) level between approximately 9% and approximately 40%. Suitable EVA resins include Elvax®, provided by E. I. du Pont de Nemours and Company, and Engage™, provided by the Dow Chemical Company, for example. In certain embodiments, the EVA may be formed of a combination of high melt index and low melt index material. For example, the EVA may have a melt index between approximately 1 and approximately 50.

As used herein, the term approximately is intended to mean about or approximately, within the constraints of sensible, manufacturing tolerances, commercial engineering objectives, costs and capabilities in the field of footwear manufacturing.

The EVA may also include various components including a blowing agent. The blowing agent may have a percent weight between approximately 10% and approximately 20%. Suitable blowing agents include azodicarboamide, for example. In certain embodiments, a peroxide-based curing agent, such as dicumyl peroxide may be used. The amount of curing agent may be between approximately 0.6% and approximately 1.5%. The EVA may also include homogenizing agents, process aids, and waxes. For example, a mixture of light aliphatic hydrocarbons such as Struktol® 60NS, available from Schill+Seilacher "Struktol" GmbH, may be included. The EVA may also include other constituents such as a release agent (e.g., stearic acid), activators (e.g., zinc oxide), fillers (e.g., magnesium carbonate), pigments, and clays.

Other suitable materials for first portion 12 and second portion 14 will become readily apparent to those skilled in the art, given the benefit of this disclosure.

As noted above, first portion 12 may be formed of a material having a first color, while second portion 14 may be formed of a material having a second color that is different than the first color. First and second portions 12, 14 may also have different values for various physical properties in order to alter or enhance the performance characteristics of the footwear. For example, first and second portions 12, 14 may have different hardnesses, densities, specific gravities, or any other beneficial physical property. Other suitable physical properties for which the first and second portions may have different values will become readily apparent to those skilled in the art, given the benefit of this disclosure.

As seen in FIG. 1, a color line or boundary 28 is formed at the boundary or interface between first portion 12 and second portion 14 of midsole 10. It is desirable to minimize the bleeding between the two different colors of first portion 12 and second portion 14, which can occur during the molding process. It is to be appreciated that the aesthetics of midsole 10 are improved by minimizing bleeding during the manufacture of midsole 10.

It is to be appreciated that more than two portions can be used to form midsole 10, in order to introduce additional colors and additional performance characteristics to midsole 10. It is to be appreciated that any number of colors can be used for different portions of midsole 10.

A first mold or mold assembly 30 used to form midsole 10 is illustrated in FIGS. 2-5, and includes a bottom or first portion 32, and a top or second portion 34. A first recess 36 formed in an upper or top surface 38 of first portion 32 and a second recess 40 formed in a lower or bottom surface 42 of second portion 34 cooperate to define a midsole preform recess 44. In the illustrated embodiment, first portion 32, which is positioned beneath second portion 34, forms a bottom surface of a preform formed in first mold 30, while second portion 34 forms a top surface of the preform formed in first mold 30. It is to be appreciated that in other embodiments, first and second portions 32, 34 can have a different positional relationship with respect to one another.

First portion 32 includes a first overflow recess 46 formed in top surface 38. First overflow 46 recess extends along an entire peripheral top edge of first recess 36, as seen most clearly in FIG. 3, has a depth that is less than a depth of first recess 36. A corresponding second overflow recess 48 is formed in the bottom surface 42 of second portion 34, extends along an entire peripheral bottom edge of second recess 40, and has a depth that is less than a depth of second recess 40. The ratio between the depths of the first and second overflow recesses and the first and second recesses can vary, depending on the particular footwear design and materials used. First overflow recess 46 and second overflow recess 48 cooperate to define a peripheral overflow chamber 50 when first mold 30 is closed with first portion 32 and second portion 34 in contact with one another, as seen in FIG. 5.

In one method of forming midsole 10, a first preform 52 and a second preform 54 are first formed in known fashion in one or more separate mold assemblies. First preform 52 may have a first peripheral preform flange 53 extending about an entire peripheral upper edge of first preform 52. Similarly, second preform 54 may have a second peripheral preform flange 55 extending about an entire peripheral lower edge of second preform 54. First preform 52 with first peripheral preform flange 53 and second preform 54 with second peripheral preform flange 55 are positioned in midsole preform recess 44 of first mold 30, which has been heated, with first peripheral preform flange 53 and second peripheral preform flange 55 being positioned within peripheral overflow chamber 50. The interface between first preform 52 and second preform 54, and between first peripheral preform flange 53 and second peripheral preform flange 55 is positioned in line with the interface between first portion 32 and second portion 34 of first mold 30.

As seen here, first preform 52 and second preform 54 have approximately the same thickness. However, it is to be appreciated that the relative thicknesses of first preform 52 and second preform 54 can vary. Thus, as seen in FIG. 1, the relative thicknesses of first portion 12 and second portion 14 vary along the length of midsole 10. The thicknesses of the portions of midsole 10 and, therefore, the preforms used to produce midsole 10, can vary along footwear 10 to accommodate different design considerations, and may also vary based on the particular materials used.

Figure 5:
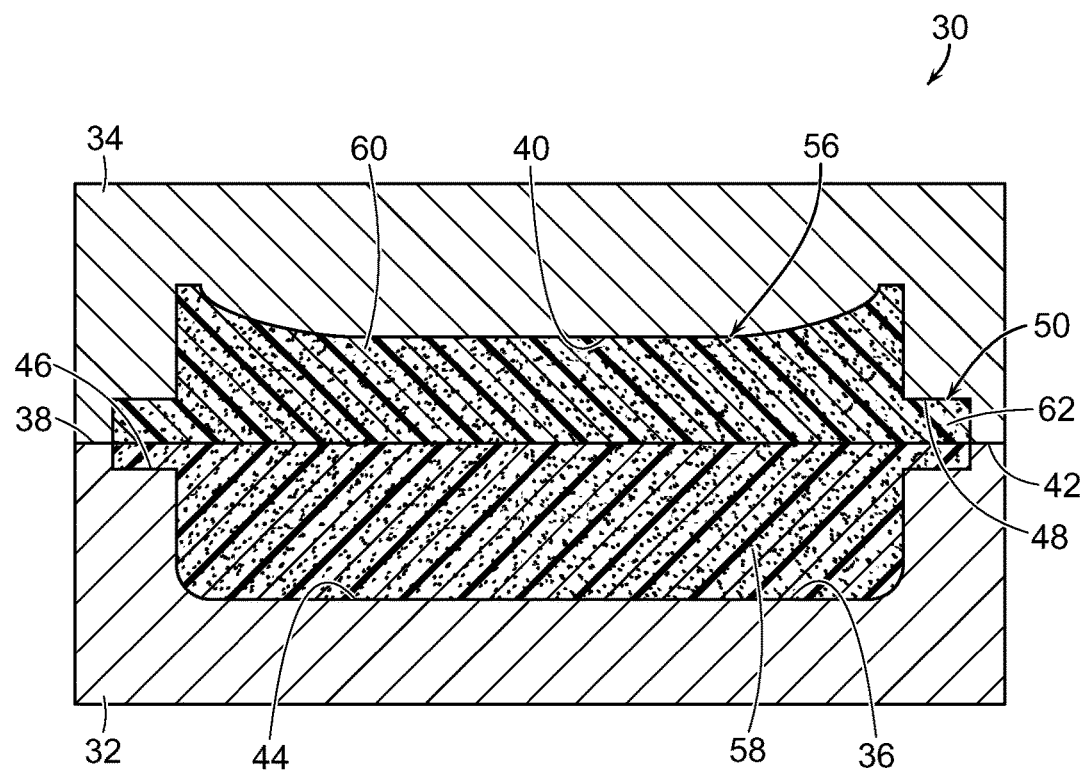
FIG. 5 is a section view of the first mold of FIG. 2, shown in a closed position after the first and second preforms have expanded and become a midsole preform.
Figure 6:
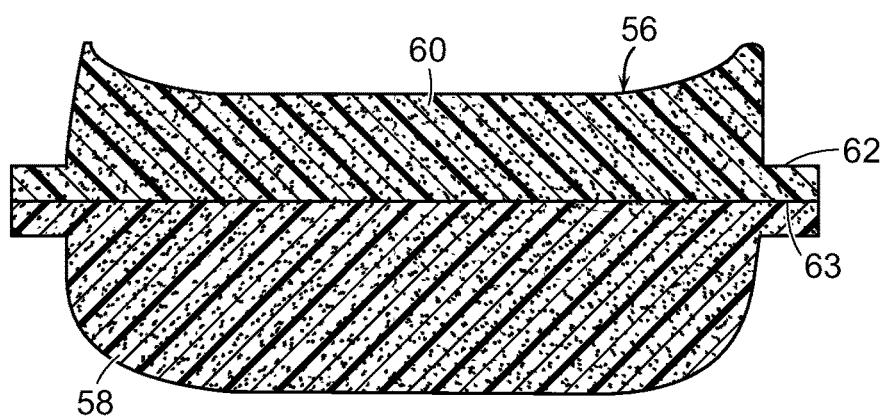
FIG. 6 is a section view of the midsole preform of FIG. 5, shown after being removed from the first mold.

First preform 52 and second preform 54 combine to form a midsole preform 56, with a peripheral preform flange 62 being formed about a periphery of midsole preform 56, as seen in FIGS. 5 and 6 and described below. As discussed above, in certain embodiments, first and second preforms 52, 54 may be formed of EVA.

A release agent may be applied to the exposed surface of first and second preforms 52, 54 and/or the surfaces of midsole preform recess 44 of first mold 30 in order to facilitate the separation of midsole preform 54 from first mold 30 after its formation. The release agent may be a spray release agent or any other suitable release agent. Suitable materials for the release agent include, for example, siloxane and water. Other suitable release agents will become readily apparent to those skilled in the art, given the benefit of this disclosure.

First mold 30 is then closed so that first portion 32 is in contact with second portion 34, with first and second preforms 52, 54 seated within midsole preform recess 44 and first peripheral preform flange 53 and second peripheral preform flange 55 seated within peripheral overflow chamber 50. First portion 32 and second portion 34 of first mold 30 may be hinged together, or they may be separate elements that are suitably aligned and placed in contact with one another.

Heat is then supplied to first mold 30 with first preform 52 and second preform 54 contained therein for a predetermined period of time. In certain embodiments, first mold 30 is heated at a temperature of approximately 130° C. for approximately 15-20 minutes, thereby causing first and second preforms 52, 54 to partially expand into midsole preform recess 44, and first peripheral preform flange 53 and second peripheral preform flange 55 expanding into peripheral overflow chamber 50. It is to be appreciated that the specific temperature and time period used to form midsole preform 56 in first mold 30 can be varied, in known fashion, depending on the particular EVA, or other material, used. As used herein, the term "approximately" is intended to mean approximately or about, within the constraints of sensible, commercial engineering objectives, costs, and capabilities in the field of footwear manufacture.

This expansion forms midsole preform 56 with first portion 58 and second portion 60, peripheral preform flange 62 extending about a periphery of midsole preform 56, and a preform boundary 63 that defines the interface between first portion 58 and second portion 60 and bisects peripheral preform 62, as can be seen in FIG. 5.

After this heating step is complete, first mold 30 is opened, and midsole preform 56 with peripheral preform flange 62 further expands in known fashion after it is removed from first mold 30. The process of bonding within first mold 30, and the expansion of midsole preform 56 and peripheral preform flange 62, can produce bleeding between the different colors of first portion 58 and second portion 60, which may create an uneven bleeding line at boundary 63 between first portion 58 and second portion 60. The formation of peripheral preform flange 62 in first mold 30 helps to make the color line at boundary 63 less uneven, and, therefore more aesthetically pleasing.

After midsole preform 56 has stabilized and cooled to ambient temperature, midsole preform 56 undergoes a compression molding step in a second mold 74. Second mold 74 includes a bottom or first portion 76, and a top or second portion 78. A first recess 80 is formed in an upper or top surface 82 of first portion 76 and a second recess 84 is formed in a lower or bottom surface 86 of second portion 78 cooperate to define a midsole recess 88. Midsole recess has a volume that is less than a volume of midsole preform 56.

In the illustrated embodiment, first portion 76, which is positioned beneath second portion 78, forms a bottom surface of midsole 10, while second portion 78 forms a top surface of midsole 10. It is to be appreciated that in other embodiments, first and second portions 76, 78 can have a different positional relationship with respect to one another.

Figure 7:
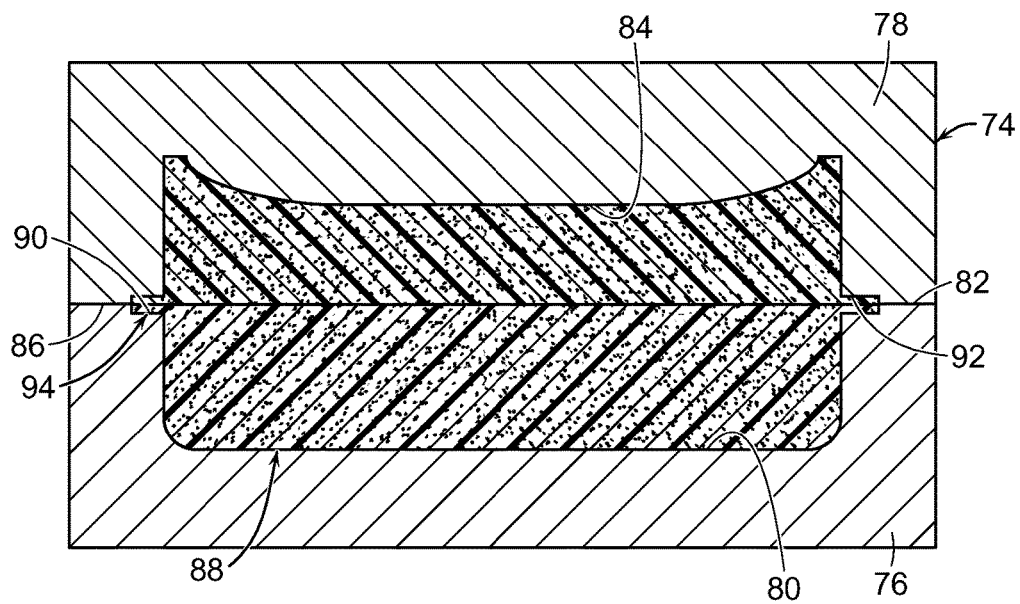
FIG. 7 is a section view of a second mold used to form the midsole of FIG. 1, shown with the midsole preform of FIG. 6 being compressed therein.
Figure 8:
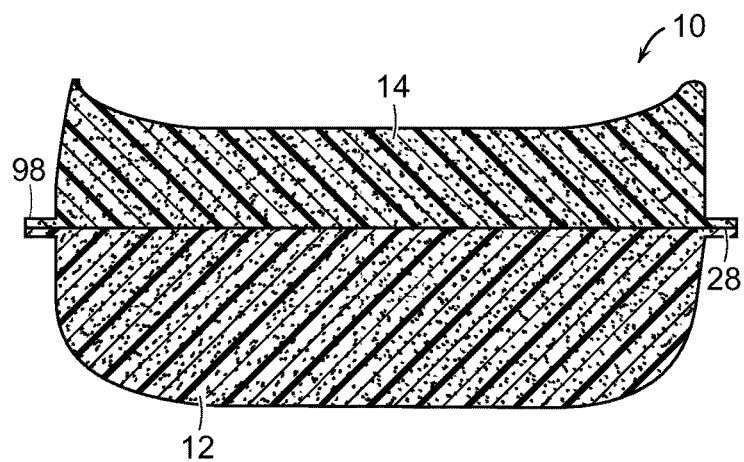
FIG. 8 is a section view of the midsole formed in the second mold of FIG. 7, shown after being removed from the second mold.
Figure 9:
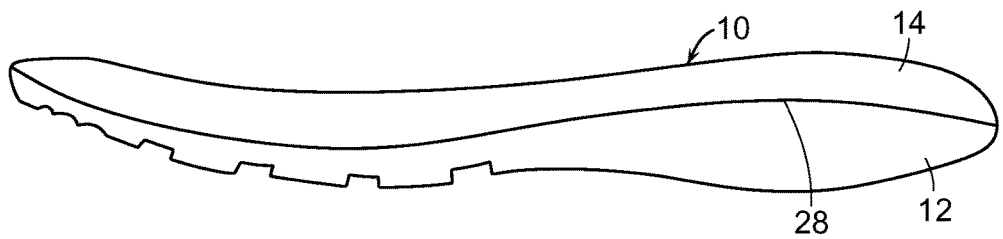
FIG. 9 is an elevation view of the midsole of FIG. 8, shown after having a peripheral flange of the midsole cut away.

A first peripheral recess 90 is formed in top surface 82 of first portion 76. First peripheral recess 90 extends along an entire peripheral top edge of first recess 80, and has a depth that is less than a depth of first recess 80. A corresponding second peripheral recess 92 is formed in the bottom surface 86 of second portion 78, extends along an entire peripheral bottom edge of second recess 84, and has a depth that is less than a depth of second recess 84. The ratio between the depths of the first and second peripheral recesses and the first and second recesses can vary, depending on the particular footwear design and materials used. First peripheral recess 90 and second peripheral recess 92 cooperate to define a peripheral chamber 94 when second mold 74 is closed with first portion 76 and second portion 78 in contact with one another, as seen in FIG. 7. Peripheral chamber 94 has a volume that is less than a volume of peripheral preform flange 62.

Midsole preform 56 is positioned within midsole recess 88 in second mold 74, with peripheral preform flange 62 being positioned within peripheral recess 92, when second mold 74 is cool, that is, at an ambient or lower temperature and not heated. Second mold 74 is then closed so that second portion 78 is in contact with first portion 76. In this embodiment, midsole recess 88, and first and second preforms 56, 58 are sized such that first and second preforms 56, 58 are compressed when second mold 74 is closed. First portion 76 and second portion 78 of second mold 74 may be hinged together, or they may be separate elements that are suitably aligned and placed in contact with one another.

Second mold 74 is then heated for a predetermined period of time. In certain embodiments, second mold 74 is heated to approximately 140° C. for approximately 15 minutes, thereby forming midsole 10 with first portion 12, second portion 14 and a peripheral flange 98. The specific temperatures and time periods used to heat second mold 74 can be varied, in known fashion, depending on the particular EVA, or other material, used.

While second mold 74 is still closed, it is cooled, allowing midsole 10 to fully cure and stabilize. This compression molding process provides midsole 10 with a finished configuration that has the same dimensions as that of midsole recess 88. In certain embodiments, second mold 74 is cooled in a closed condition for approximately 15 minutes until the temperature of second mold 74 is below approximately 35° C.

Once midsole 10 is completely stabilized and cured, second mold 74 is opened, and midsole 10 including first portion 12, second portion 14, and peripheral flange 98 is removed from second mold 74. Boundary 28, which is formed at the interface between first portion 12 and second portion 14 bisects peripheral flange 98. Once midsole 10 is removed from second mold 74, peripheral flange 98 is cut away from midsole 10, leaving boundary 28 between first portion 12 and second portion 14 of midsole 10 exposed. It is to be appreciated that midsole 10 may undergo further finishing steps, as required.

As noted above, providing different physical properties for first and second preforms 52, 54, or any other additional preforms and, therefore, first and second portions 12, 14, allows midsole 10 to be customized or optimized to provide particular aesthetic and/or performance characteristics.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method of manufacturing a midsole for an article of footwear comprising
   placing first and second preforms in contact with one another in a preform recess in a first mold, first and second portions of the first mold cooperating to define the preform recess and a peripheral overflow chamber extending about a periphery of the preform recess;
   closing the first mold by positioning the first and second portions in contact with one another;
   heating the first mold for a predetermined period of time at a predetermined temperature such that the first and second preforms expand within the preform recess and into the peripheral overflow chamber to produce a midsole preform with a peripheral preform flange extending about a periphery of the midsole preform;
   removing the midsole preform from the first mold;
   allowing the midsole to further expand and cool;
   placing the midsole preform in a midsole recess of a second mold and the peripheral preform flange in a peripheral recess of the second mold, first and second portions of the second mold cooperating to define the midsole recess and the peripheral recess extending about a periphery of the midsole recess, with a volume of the midsole recess being less than a volume of the midsole preform, and a volume of the peripheral recess being less than a volume of the peripheral preform flange;
   closing the second mold by positioning the first and second portions in contact with one another, thereby compressing the midsole preform and the peripheral preform flange to produce a midsole with a peripheral flange;
   heating the second mold for a predetermined period of time at a predetermined temperature;
   allowing the second mold to cool;
opening the second mold; and
   trimming away the peripheral flange of the midsole.

2. The method of claim 1, wherein the midsole preform recess comprises a first recess formed in the first portion of the first mold and a second recess formed in the second portion of the first mold, and the overflow recess comprises a first overflow recess formed in the first portion of the first mold and a second overflow recess formed in the second portion of the first mold.

3. The method of claim 1, wherein the midsole recess comprises a first recess formed in the first portion of the second mold and a second recess formed in the second portion of the second mold, and the peripheral recess comprises a first peripheral recess formed in the first portion of the second mold and a second peripheral recess formed in the second portion of the second mold.

4. The method of claim 1, wherein the first preform includes a first preform peripheral flange and the second preform includes a second preform peripheral flange.

5. The method of claim 1, wherein the first mold is heated for between approximately 15 minutes and approximately 20 minutes, and the first temperature is approximately 130° C.

6. The method of claim 1, wherein the second mold is heated for approximately 15 minutes and is cooled to below approximately 35° C.

7. The method of claim 1, wherein the first and second preforms are formed of ethylene vinyl acetate.

8. The method of claim 1, wherein the first preform has a first color and the second preform has a second color different from the first color, and wherein a boundary between the first color and the second color bisects the peripheral flange of the midsole.

9. The method of claim 1, wherein a physical property of the first preform is different than a physical property of the second preform.

10. A method of manufacturing a midsole for an article of footwear comprising
    placing a first preform having a first preform peripheral flange and a second preform having a second preform peripheral flange in contact with one another in a preform recess in a first mold, the first and second preforms being positioned in a preform recess in the first mold, a first recess formed in a first portion of the first mold and a second recess formed in a second portion of the first mold cooperating to define the preform recess, the first and second preform peripheral flanges being positioned in a peripheral overflow chamber of the first mold, a first overflow recess formed in the first portion of the first mold and a second overflow recess formed in the second portion of the first mold cooperating to define the peripheral overflow chamber;
    closing the first mold by positioning the first and second portions in contact with one another;
    heating the first mold for a predetermined period of time at a predetermined temperature such that the first and second preforms expand within the preform recess and the first and second preform peripheral flanges expand within the peripheral overflow chamber to produce a midsole preform with a peripheral preform flange extending about a periphery of the midsole preform;
    removing the midsole preform from the first mold;
    allowing the midsole to further expand and cool;
    placing the midsole preform in a midsole recess of a second mold and the peripheral flange in a peripheral recess of the second mold, a first recess in the first portion of the second mold and a second recess in the second portion of the second mold cooperating to define the midsole recess, a first peripheral recess in the first portion of the second mold and a second peripheral recess in the second portion of the second mold cooperating to define the peripheral recess, and the peripheral recess extending about a periphery of the midsole recess, with a volume of the midsole recess being less than a volume of the midsole preform and a volume of the peripheral recess being less than a volume of the peripheral flange;
    closing the second mold by and compressing the midsole preform and the peripheral preform flange by aligning the first recess in the first portion of the second mold and the second recess in the second portion of the second mold and bringing the first and second portions into contact with one another to form a midsole with a peripheral flange;
    heating the second mold for a predetermined period of time at a predetermined temperature;
    allowing the second mold to cool;
    opening the second mold; and
    cutting away the peripheral flange of the midsole.

11. The method of claim 10, wherein the predetermined period of time is between approximately 15 minutes and approximately 20 minutes, and the first temperature is approximately 130° C.

12. The method of claim 10, wherein the first and second preforms are formed of ethylene vinyl acetate.

13. The method of claim 10, wherein the first preform has a first color that is different than a second color of the second preform.

14. The method of claim 13, wherein a boundary between the first color and the second color bisects the peripheral flange of the midsole.

15. The method of claim 10, wherein a physical property of the first preform is different than a physical property of the second preform.

\* \* \* \* \*